United States Patent Office 3,376,478
Patented Apr. 2, 1968

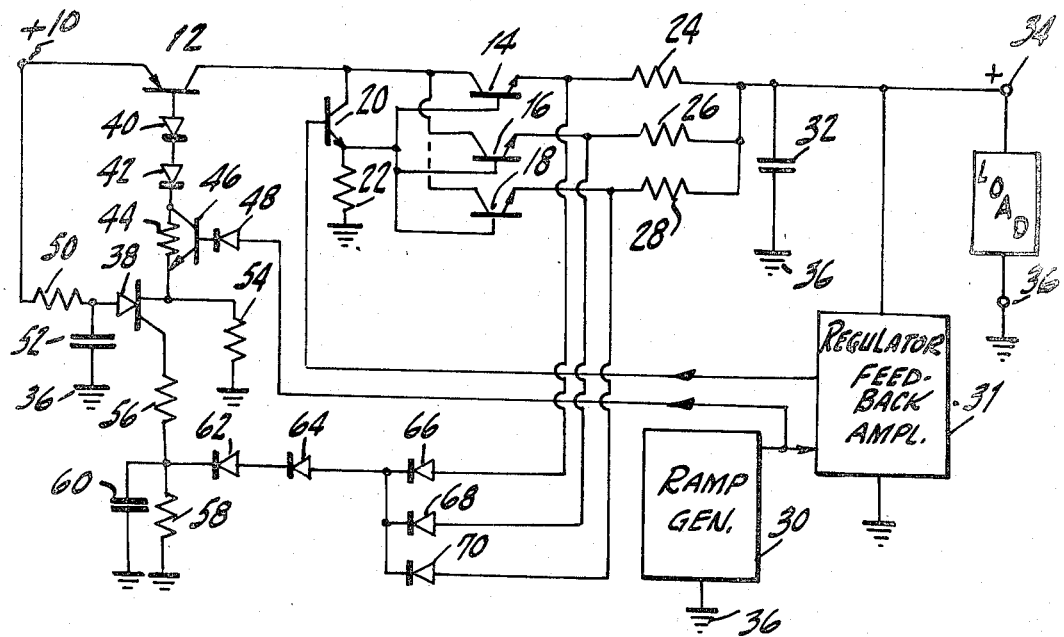

3,376,478
VOLTAGE REGULATED POWER SUPPLY INCLUDING RAMP VOLTAGE STARTING MEANS AND OVER-CURRENT PROTECTIVE MEANS
Alfredo S. Sheng and Allen Y. Chen, Cherry Hill, N.J., assignors to Radio Corporation of America, a corporation of Delaware
Filed Jan. 28, 1966, Ser. No. 523,675
7 Claims. (Cl. 317—31)

ABSTRACT OF THE DISCLOSURE

A voltage regulated source is provided which includes means to cause the voltage of the source to increase gradually to its set value when the power supply is turned on and means to shut the source off if elements thereof become short circuited.

---

This invention relates to a circuit for protecting load elements connected to a voltage regulator from over-voltage transients which can occur should a transistor or other element comprising part of the regulator become short-circuited.

When the full unregulated supply voltage is applied on start-up to the input of a voltage regulator which supplies regulated voltage to load elements, transient over-voltages can appear across these load elements. These transient voltages may be so high as to damage or destroy the load elements. To prevent such destruction, a ramp circuit can be included in the regulator. This ramp circuit causes gradual linear application of voltage to the load elements, that is, regulated voltage is applied to the circuit elements comprising the load which increases from zero to its maximum value in a linear manner over a predetermined period of time, whereby transient output voltages of the regulator are substantially reduced or even eliminated and whereby the circuit elements supplied by the regulator are not damaged or destroyed. However, upon a circuit element of the regulator becoming short-circuited, the ramp function thereof is omitted. Also, upon short-circuit of a portion of the regulator, the unregulated voltage is applied to the load whereby protective and regulating features of the regulator are not realized. Such a failure of the regulator is evidenced by the application of a sudden surge of voltage to the load. Known overvoltage protective means which reduce or interrupt the flow of current through the load are too slow in operation to protect many types of circuit elements.

It is an object of this invention to provide an improved quick acting overvoltage protective circuit.

It is another object of this invention to provide an improved quick acting overvoltage protective circuit with a voltage regulator employing a ramp circuit.

In accordance with this invention, a variable impedance element is connected in series between an unregulated voltage source and a voltage regulator employing a ramp voltage generator. The output voltage of the regulator is sensed and if this voltage exceeds a predetermined safe amount, a trigger element or switch element is caused to become conductive to cause the variable impedance element to increase its impedance to a high value to substantially cut off the unregulated voltage supply to the regulator. Since quick acting solid state devices are used as distinct from circuits including movable contacting elements, the protective circuit operates to disconnect the unregulated source from the regulator quickly enough so as to prevent damage or destruction of the circuit elements supplied by the regulator.

The invention is more fully explained in the following description when taken with the accompanying drawing in which the sole figure is a circuit diagram of one embodiment of a protection circuit according to this invention.

The emitter of a PNP transistor 12 is shown connected to the positive terminal 10 of an unregulated voltage supply, not shown. The collector of transistor 12 is connected to the collectors of a plurality of NPN series regulating transistors 14, 16 and 18. While three series transistors are shown, more or fewer thereof may be provided as necessary to carry the current required by a load which is supplied through the series transistors. Control current for controlling the conductivity of the transistors 14, 16 and 18 is applied to the bases of the transistors 14, 16 and 18 by a NPN transistor 20 whose collector is connected to the collectors of the transistors 12, 14, 16 and 18 and whose emitter is connected to the bases of the transistors 14, 16 and 18. The emitter of the transistor 20 is also connected to ground through a resistor 22. Control current for the transistor 20 is developed by a ramp generator 30, by way of a voltage regulator feedback amplifier 31, between the base of the transistor 20 and ground. The emitters of the transistors 14, 16 and 18 are connected through individual balancing resistors 24, 26 and 28 to a load terminal 34. A storage capacitor 32 is connected between the terminal 34 and ground or a reference potential point 36.

The ramp generator 30 provides a voltage which starts at substantially zero when the power supply thereto, not shown, is turned on and increases to a maximum value in a linear manner over a predetermined short period of time and remains at its maximum value as long as the power supply is on. The ramp circuit is provided with power by a regulated source (not shown) whereby the maximum value of the ramp voltage is constant. The feedback amplifier 31 compares the voltage appearing across the load terminals 34 and 36 with a standard voltage using conventional techniques and applies an error voltage to the base of the driver transistor 20. The output of the ramp generator 30 is applied to the feedback amplifier 31 to cause the error voltage supplied thereby to vary from substantially zero when the voltage of the ramp generator 30 is zero, that is, before the regulator is turned on, to the full error voltage when the ramp voltage reaches a predetermined value. That is, the voltage applied to the base of the transistor 20 varies in a linear manner over a predetermined short period of time from zero when the ramp voltage is zero to a voltage regulating value when the ramp voltage is above a predetermined value. This may be accomplished by connecting a shunt circuit across the error voltage output in the feedback amplifier 31 and decreasing the conductivity of the shunt as the ramp voltage increases. Since the ramp circuit 30 and the feedback amplifier 31 are conventional, no further explanation of these circuits or the operation thereof is necessary.

In the circuit so far described, let it be assumed that the transistor 12 is saturated, whereby it exhibits very little resistance, and that a ramp voltage varying in a linear manner from zero to a positive maximum value, which is fixed at a voltage regulating value by the feedback amplifier 31 through which it is fed, is applied to the base of the transistor 20. Then a current will be applied to the bases of all the transistors 14, 16 and 18, which rises in a linear manner from substantially zero in a predetermined manner, and the resistance of the transistors 14, 16 and 18 will be gradually reduced from a maximum to a lesser regulated value whereby the current fed to the load, which is connected between the output terminals 34 and 36, will be gradually increased to its regulated value. In this manner, transient voltages caused by the sudden application of the full input voltage to the load elements will be minimized or entirely eliminated. If, however, any one of the series transistors 14, 16 or 18 or the control or driver transistor 20 becomes short-circuited, no ramp control is provided and the high, unregulated, uncontrolled voltage appearing at the terminal 10 will be applied directly to the load whereby the undesired transients will appear in the output thereof. Furthermore, if one of these transistors 14 through 20 is short-circuited, no voltage regulating function is performed thereby. According to this invention, fast acting means are provided to prevent application of voltages to the load from the source 10 if any one of transistors 14 through 20 becomes short-circuited. This means includes the transistor 12 and other apparatus to be described to control its conductivity.

The base of the transistor 12 is connected to the cathode of a silicon controlled rectifier (SCR) 38 through two diodes 40 and 42 and a resistor 44 in series. The collector and emitter of a NPN transistor 46 are connected to the respective terminals of the resistor 44, and the base of the transistor 46 is connected through a diode 48 to the ramp voltage generator 30. The anode of the SCR 38 is connected through a suppression network resistor 50 to the terminal 10 and through a suppression network capacitor 52 to ground. The suppression network resistor 50 and capacitor 52 act to prevent application of transient voltages to the anode of the SCR 38. The cathode of the SCR 38 is also connected to ground through a resistor 54. The control electrode of the SCR 38 is connected to ground through two resistors 56 and 58 in series, one end of the resistor 58 being connected to ground and the resistor 58 being shunted by a capacitor 60. Three diodes 62, 64 and 66 are connected in series in the order named between the junction of the resistors 56 and 58 and the junction of the emitter of the transistor 14 and the resistor 24. A diode 68 is connected between the junction of the emitter of the transistor 16 and the resistor 26 to the junction of the diodes 64 and 66, and a diode 70 is connected between the junction of the emitter of the transistor 18 and the resistor 28 to the junction of the diodes 64 and 66. The described diodes act as an "Or" circuit to sense the voltage developed across the resistors 24, 26 and 28, and to provide a threshold value in the application of the voltages appearing across the resistors 24, 26 and 28 to the control electrode of the SCR 38 as will be more fully described. With respect to each of the diodes shown in the drawing, the direction of the arrow indicates current flow from anode to cathode of the respective diodes.

In normal operation, a ramp voltage which rises in a positive direction from ground is applied to the bases of the transistors 20 and 46 when the power supply 10 is turned on. As stated above, the ramp voltage is applied to the base of the transistor 20 through the feedback amplifier 31. The conductivity of the transistors 14, 16, 18, 20 and 46 is thereby linearly increased, and due to the increase in conductivity of the transistor 20, the transistors 14, 16 and 18 become more or less conductive, depending on the error voltage provided by the amplifier 31 at the end of the ramp voltage. The transistor 46 in shunt with the resistor 44 acts to cut down on the maximum amount of current passing through the resistors 44 and 54 whereby smaller resistors 44 and 54 may be used. When the operation of the disclosed circuit is normal, that is, when the current supplied to the load varies linearly from zero to the maximum required thereby, and does not increase over the required maximum, the cathode of the SCR 38 is at a higher positive voltage with respect to ground than the gate or control electrode thereof, whereby the SCR 38 is nonconductive. The voltages appearing at the emitters of the transistors 14, 16 and 18 are applied through the forward biased diodes 62 through 70 to the junction of the resistors 56 and 58. The voltage developed across the resistor 54 due to current flow therethrough is applied to the cathode of the SCR 38. The several diodes in series comprising diodes 62, 64 and one of 66, 68 and 70 have a threshold value of voltage in a forward direction such that, during normal operation, the voltage at the junction of resistors 56 and 58 is always less than the cathode voltage of the SCR 38. Therefore during normal operation, the voltage at the emitters of the transistors 14, 16 and 18 cannot cause conduction of the SCR 38.

During normal operation, the resistor 54 carries a constant current since the voltage on the emitter of the transistor 46 is kept at a constant value with respect to ground by the maximum value of the ramp voltage applied to the base of the transistor 46. Since the current through the resistor 54 is constant, the sum of the currents through the resistor 44 and the transistor 46 collector to emitter path is constant. The resistor 44 and the transistor 46 are so chosen that when the unregulated input voltage at the terminal 10 is a maximum, the greater part of the constant base current of the transistor 12 will flow through the resistor 44, and when the unregulated input voltage is a minimum, the greater part of the base current of the transistor 12 will flow through the transistor 46. Therefore, the transistor 46 and its described connections perform a first function of rendering constant the current flow through the base of the transistor 12 whereby the wattage of the resistors 44 and 54 may be chosen to carry this constant current rather than being of higher wattage and therefore able to carry an occasional higher value of current, providing a more practical circuit. The transistor 46 and its described connections perform a second function of applying a fixed voltage to the cathode of the SCR 38, whereby the potential on the cathode of the SCR 38 is prevented from varying even though the voltage of the source 10 may vary. By this means, the operation of the SCR 38 to perform its protective function as described below is made more reliable than would be the case in the absence of the transistor 46 and its connections.

Should a short-circuit of transistor 20 occur, the transistors 14, 16 and 18 are driven to full conduction, whereby the voltage across the three resistors 24, 26 and 28 rises. Also in the case of a short-circuit of any one of the transistors 14, 16 or 18, current flowing through that one of the transistors 14, 16 and 18 rises to a high level whereby the voltage appearing across the corresponding one of the resistors 24, 26 or 28 also rises. In either case, sufficient voltage and current are supplied to the control electrode of the SCR 38 through the diodes 62 through 70 to render the SCR 38 conductive. The capacitor 60 serves as a filter to prevent application of noise spikes, which might appear in the system, from being applied to the SCR 38. When the SCR 38 becomes conductive, the source 10 is shunted to ground through the SCR 38 and the resistor 54, and the voltage at the cathode of the SCR 38 is reduced to about one volt. The voltage drop in the transistor emitter-to-base path of the transistor 12 and in the diodes 40 and 42 and in the resistor 44 all in series, in the worst case, is about two volts. Therefore, the emitter of the transistor 12 is no longer positive with respect to the base thereof when the SCR 38 is conductive and the transistor 12 is rendered nonconductive. The supply 10 is thereby disconnected from the load and the circuit elements supplied from the regulator are protected when short-circuits develop in any one of the transistors 14 through 20. Once the SCR 38 becomes conductive, it remains conductive until the voltage supply 10 is turned off. The resistor 54 in this abnormal case acts as a current limting resistor to protect the SCR 38. The disconnection of the source 10 from the circuit elements by the operation of the SCR 38 takes place in such a short time that the heat generated in the protected circuit elements is not sufficient to damage them.

Silicon diodes known in the trade as IN4719 are suitable for use as diodes 40 and 42. Germanium diode IN91 may be used for diode 48 and silicon diodes IN457 are suitable for use as diodes 62 through 70.

Since variations in the described circuit are obvious, the above description should be considered as illustrative and not in a limiting sense.

What is claimed is:

1. An overvoltage protection circuit comprising
   a pair of variable resistances and a balancing resistor connected in series for current conduction between a source of voltage and a load,
   means to increase the conductivity of one of said variable resistances from a lesser to a greater value in a gradual manner,
   a voltage controllable switch connected between said source and a point of reference potential,
   means to apply the voltage appearing across said balancing resistor to render said voltage controllable switch conductive when said voltage exceeds a predetermined value, and
   means to render said other variable resistance substantially nonconductive in response to said switch becoming conductive whereby said load is protected against overvoltage.

2. A protection circuit as claimed in claim 1 in which said variable resistances and said voltage controllable switch each have a pair of main electrodes and a control electrode,
   said source being connected to said load by way of the main electrodes of said variable resistances,
   said means for controlling the conductivity of said one of said variable resistances including a circuit element for applying a gradually varying ramp control voltage between the control electrode and a main electrode thereof,
   the connection of said switch to said source and to said reference potential point including the pair of main electrodes of said switch,
   said means to apply voltage to said switch comprising a connection from said balancing resistor to the control electrode of said switch, and
   said means for rendering said other variable resistance substantially nonconductive including a connection between the main electrode of said switch that is connected to said point of reference potential and the control electrode of said other variable resistance.

3. A protection circuit as claimed in claim 2 in which said connection between said main electrode of said switch and said control electrode of said other variable resistance includes a resistor,
   a transistor having a pair of main electrodes and a control electrode,
   said main electrodes of said last mentioned transistor being connected across said last mentioned resistor, and
   means for applying a ramp voltage to the control electrode of said last mentioned transistor.

4. A protection circuit as claimed in claim 2 in which a threshold device is included in said connection between said balancing resistor and said control electrode of said switch.

5. The invention as expressed in claim 3 in which a threshold device is included in series with said resistor between the main electrode of said switch and the control electrode of said other variable resistance.

6. An overvoltage protection circuit for a power supply including a ramp voltage device comprising
   a plurality of transistors each having a pair of main electrodes and a control electrode,
   a balancing resistor,
   means for connecting a main electrode of a first transistor to a source of voltage and a main electrode of a second transistor through said balancing resistor to a load,
   means for connecting the remaining main electrodes of said first and second transistors together,
   means to connect the main electrodes of a third transistor respectively to the main electrode and the control electrode of said second transistor,
   means to apply a ramp voltage to the control electrode of said third transistor to gradually increase the conductivity of said second transistor from a first value to a higher value,
   a voltage controlled switch having two main electrodes and a control electrode,
   a second resistor,
   means to connect one main electrode of said switch to said source and the other main electrode of said switch to a point of reference potential through said second resistor,
   a diode,
   a third resistor,
   means to connect the control electrode of said first transistor through said diode and said third resistor to that main electrode of said switch which is connected to said point of reference potential,
   a fourth transistor having its main eletcrodes connected across said third resistor,
   means to apply a ramp voltage to the control electrode of said fourth transistor in a direction to make it more conductive, and
   a connection joining a point between said main electrode of said second transistor and said balancing resistor to the control electrode of said switch,
   said last mentioned connection including a thresholding device.

7. A protection circuit as claimed in claim 6 including means to sense the voltage across said load, and
   means to vary the value of said ramp voltage applied to the control electrode of said third transistor in accordance with the voltage across said load.

References Cited
UNITED STATES PATENTS

| | | | |
|---|---|---|---|
| 3,192,441 | 6/1965 | Wright | 317—33 |
| 3,303,388 | 2/1967 | Means | 317—33 |

FOREIGN PATENTS

| | | |
|---|---|---|
| 1,300,021 | 6/1962 | France. |

MILTON O. HIRSHFIELD, *Primary Examiner.*

R. V. LUPO, *Assistant Examiner.*